(12) United States Patent  
Buresh et al.

(10) Patent No.: US 8,900,388 B2
(45) Date of Patent: Dec. 2, 2014

(54) TIRE WITH TREAD PROFILE HAVING CONTINUOUS CURVATURE AND METHOD FOR FORMING TIRE

(75) Inventors: Patrick Jon Buresh, Bend, OR (US); Bernard Guerinon, Clermont-Ferrand (FR); Emmanuel Igier, Aigueperse (FR); Bernard Thevand, Cebazat (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 981 days.

(21) Appl. No.: 12/895,239

(22) Filed: Sep. 30, 2010

(65) Prior Publication Data

US 2012/0080128 A1 Apr. 5, 2012

(51) Int. Cl.
*B29D 30/00* (2006.01)
*B60C 11/00* (2006.01)

(52) U.S. Cl.
CPC ..... *B60C 11/0083* (2013.01); *B60C 2011/0033* (2013.01)
USPC ........................ 156/110.1; 152/209.14; 703/1

(58) Field of Classification Search
USPC ............ 156/110.1; 703/1, 2, 6, 8; 152/209.14
See application file for complete search history.

(56) References Cited

U.S. PATENT DOCUMENTS

| 5,710,718 A | 1/1998 | Kamegawa et al. |
| 6,073,668 A | 6/2000 | Iwasaki et al. |
| 6,575,214 B1 | 6/2003 | Iwasaki et al. |

FOREIGN PATENT DOCUMENTS

JP 2000-052716 A * 2/2000

OTHER PUBLICATIONS

Machine translation for Japan 2000-052716 (no date).*

* cited by examiner

*Primary Examiner* — Steven D Maki
(74) *Attorney, Agent, or Firm* — Dority & Manning, P.A.

(57) ABSTRACT

A tire and a method for forming a tire tread are disclosed. The tire includes a tread defining an inferior tread profile and a superior tread profile, the superior tread profile having a generally continuous curvature between an edge of contact and a top center point. The superior tread profile includes a plurality of control points and a plurality of splines. Each of the plurality of splines extends between at least two of the plurality of control points. Curvatures of adjacent splines are generally equal at each of the plurality of control points.

6 Claims, 3 Drawing Sheets

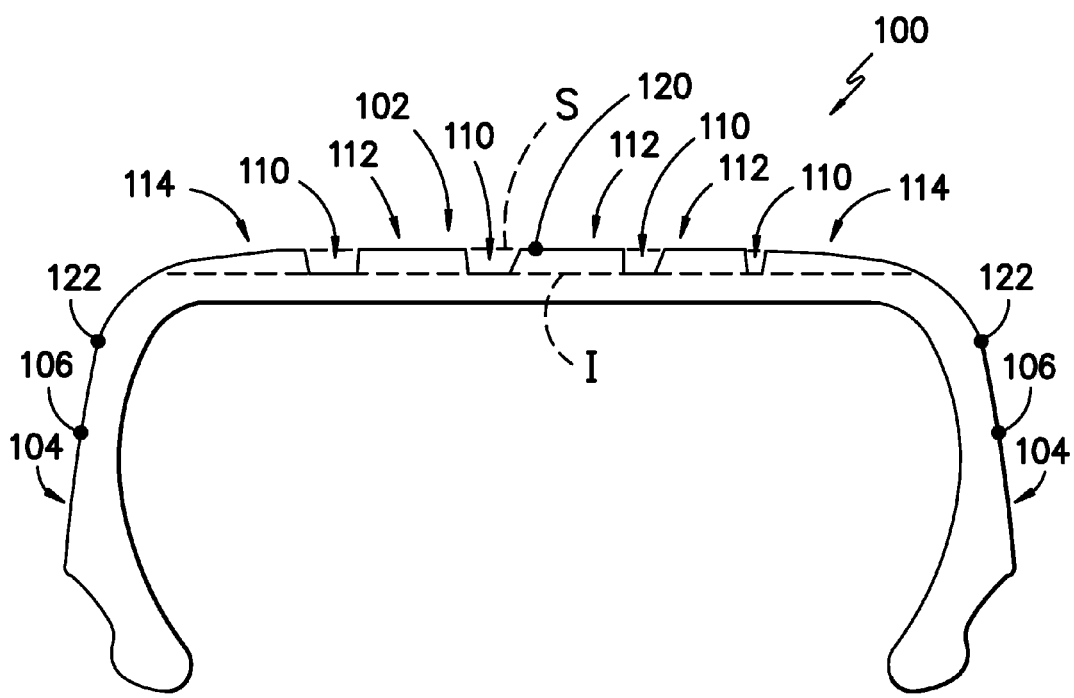
FIG. -1-
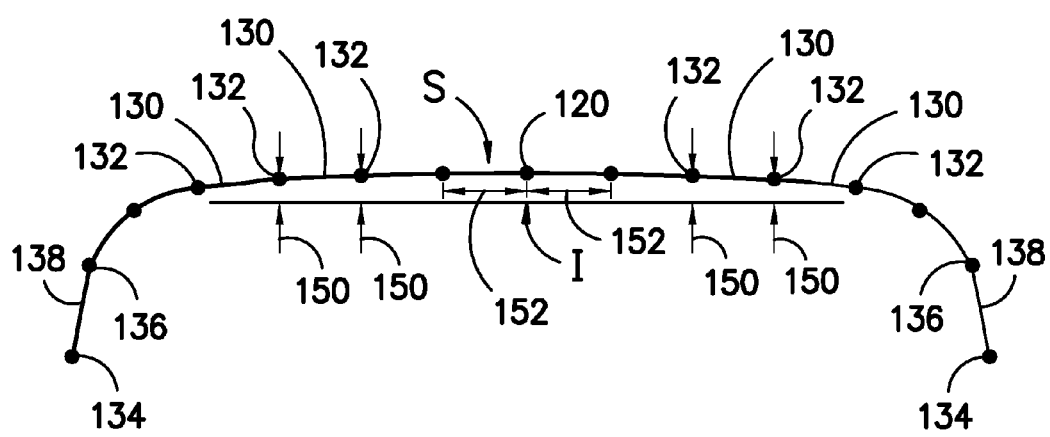
FIG. -2-

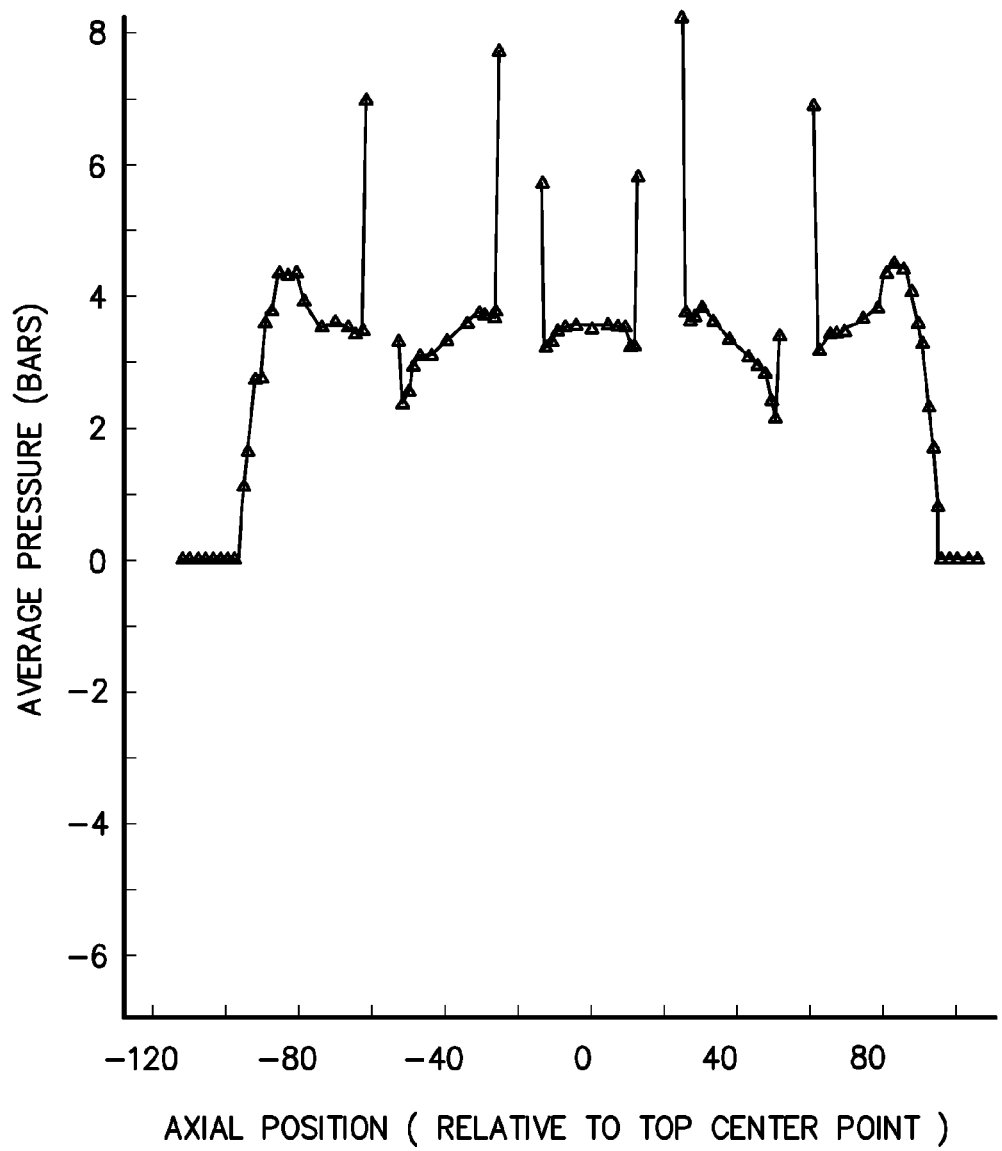
FIG. -3-
PRIOR ART

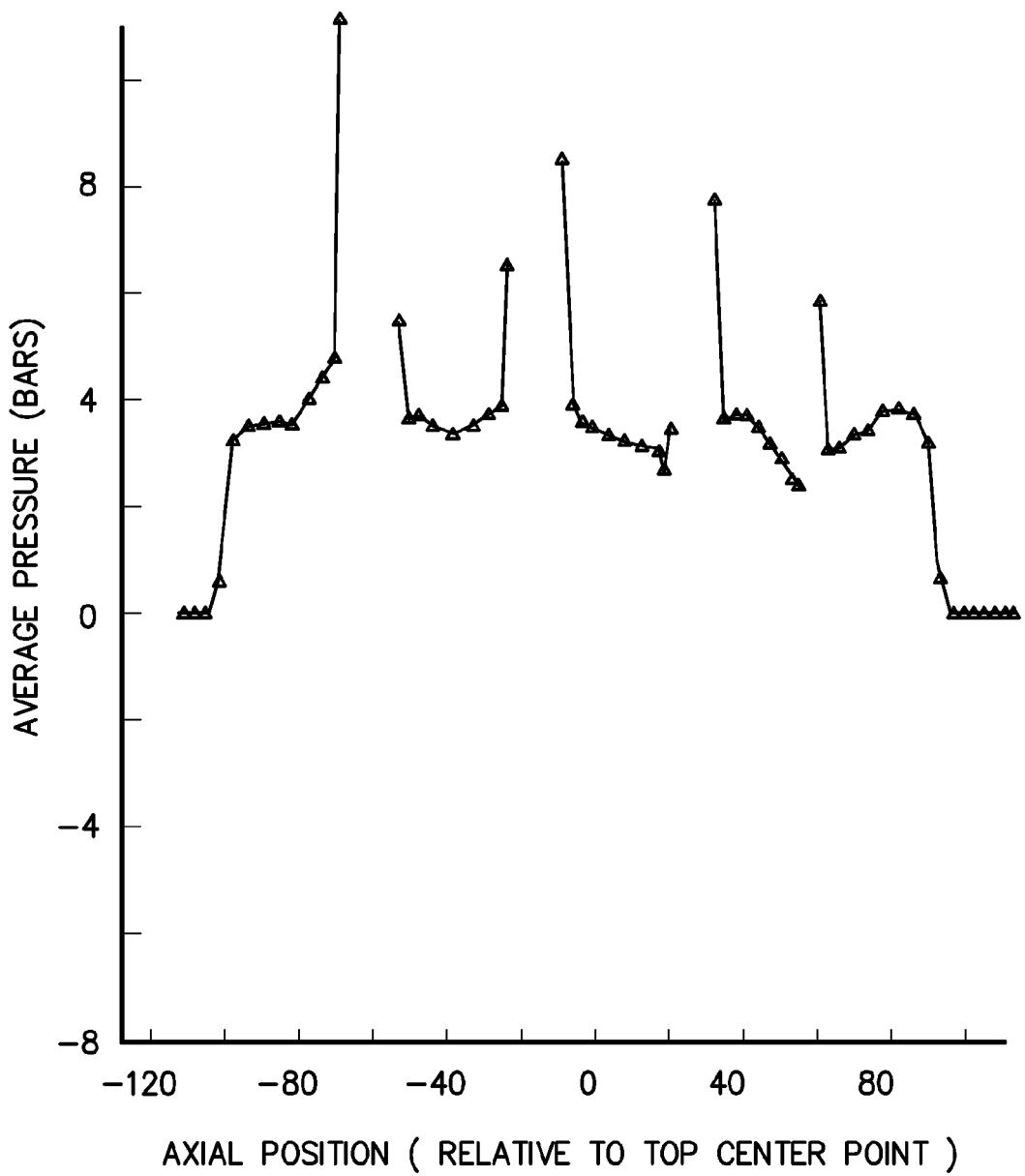
FIG. -4-

TIRE WITH TREAD PROFILE HAVING CONTINUOUS CURVATURE AND METHOD FOR FORMING TIRE

FIELD OF THE INVENTION

The present invention relates to a tire with a tread profile having a continuous curvature and a method for forming the tire, and more particularly to a tire with a tread profile that utilizes splines to develop a continuous curvature.

BACKGROUND OF THE INVENTION

The design of the tread profile for a tire is an important factor in the performance of the tire. For example, when a tire rolls across a surface, the tire is subject to cyclical compressive forces. The design of the tread profile for the tire may have a significant impact on the pressure distributions that are developed in the tire tread due to these compressive forces. Portions of the tread that are subjected to relatively higher contact pressures may fatigue faster than other portions of the tread, thereby resulting in unacceptable performance.

One portion of the tread that may be of concern is the shoulder rib. In many tires, the shoulder rib may have a tendency to wear during typical use. Further, the shoulder rib may be subjected to increased forces when, for example, the tire is turned during use. Specifically, when a vehicle utilizing the tire turns during use, the tread, and specifically one of the shoulder ribs of the tread, may be subjected to suddenly increased forces. Thus, the potential for fatigue and failure of the tire at the shoulder ribs may be one area of concern in the design of tread profiles.

Conventional tread profile designs utilize arcs to define and model the tread profile. For example, a variety of arcs may be formed between the shoulder of the tire or the edge of contact of the tread and the top center point of the tread. The tread profile may be modeled based on these arcs. However, the use of arcs to define and model a tread profile has disadvantages. For example, the curvature of the arcs at the intersections of adjacent arcs may have different curvatures. These varying curvatures may cause difficulties in controlling the pressure distributions at the arc intersections.

In particular, the pressure distributions across the shoulder ribs may be difficult to control when arcs are utilized to define and model a tread profile. For example, FIG. 3 provides a data plot illustrating one example of the pressures across a tire tread formed utilizing arcs. The tire tread formed and tested according to FIG. 3 was designed using five arcs between the top center point of the tread and the intersection between the tread and the sidewall. As illustrated by FIG. 3, the relative pressure distribution along this tread is undesirably high in important areas of the tread. For example, the pressure distribution on the exterior portions of the shoulders ribs may be undesirably high. Specifically, with reference to the X-axis in FIG. 3, the pressures in the region between an axial position of approximately −90 and an axial position of approximately −75, and in the region between an axial position of approximately 75 and an axial position of approximately 90, may be undesirably high.

Therefore, a tread profile and a method for forming the tread profile that helps to control pressure distributions in a tire tread would be useful. Further, a tread profile having a continuous curvature throughout the profile and a method for forming the tread profile would be useful. These and other advantages will be apparent from the description of the present invention that follows below.

SUMMARY OF THE INVENTION

Aspects and advantages of the invention will be set forth in part in the following description, or may be obvious from the description, or may be learned through practice of the invention.

In one exemplary embodiment, the present invention provides a tire. The tire includes a tread defining an inferior tread profile and a superior tread profile, the superior tread profile having a generally continuous curvature between an edge of contact and a top center point. The superior tread profile includes a plurality of control points and a plurality of splines. Each of the plurality of splines extends between at least two of the plurality of control points. Curvatures of adjacent splines are generally equal at each of the plurality of control points.

In another exemplary embodiment, the present invention provides a method for forming a tire tread, the tire comprising the tread and a sidewall. The method includes defining an inferior profile of the tread. The method further includes defining a plurality of control points spaced from the inferior profile. Each of the plurality of control points is spaced from the inferior profile by a depth parameter. Each of the plurality of control points is spaced from adjacent control points of the plurality of control points by a width parameter. The method further includes forming a plurality of splines, each of the plurality of splines extending between at least two of the plurality of control points. Further, the method includes adjusting each of the plurality of splines at each of the control points such that the curvatures of adjacent splines are generally equal at each of the plurality of control points.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a cross-sectional view, along the meridian plane, of a tire schematic according to one exemplary embodiment of the present disclosure;

FIG. 2 illustrates one exemplary embodiment of the various splines and control points utilized to model a tire tread in accordance with the present disclosure;

FIG. 3 provides a data plot illustrating the pressures across a tire tread developed according to prior art methods utilizing arcs; and FIG. 4 provides a data plot illustrating the pressures across a tire tread developed according to one exemplary embodiment of the present disclosure.

DETAILED DESCRIPTION OF THE INVENTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents. For example, in the description that follows, exemplary embodiments of the present invention will be described in conjunction with an exemplary tire and a method for forming the tire. Using the teaching disclosed herein, however, it will be understood by one of ordinary skill in the art that other exemplary tires and methods for forming the tires are within the scope of the present invention and claims that follow.

"Meridian Plane" means a plane that passes through and includes the axis of rotation of a tire.

FIG. 1 illustrates an exemplary embodiment of a tire 100 of the present disclosure. More particularly, the tire 100 includes a tread 102 and sidewalls 104. The tread 102 and each of the sidewalls 104 may define an intersection 106 therebetween. The tread 102 may define a plurality of grooves 110. Each of the grooves 110 may extend generally circumferentially around the tire 100. The grooves 110 may at least partially define a plurality of ribs 112. The ribs 112 may also extend circumferentially around the tire 100. Further, the ribs 112 may include shoulder ribs 114 defining the shoulders of the tire 100, as is generally known in the art.

An inferior tread profile I may be defined by the bottom of at least one of the grooves 110. The inferior tread profile I may have any suitable shape. For example, in some embodiments, the inferior tread profile I may be a curve of constant radius or a line that is tangent to the groove bottom of at least one groove 110 defined in the tread 102 of the tire 100. In other embodiments, the inferior tread profile I may have a varying radius and/or other suitable characteristics. Further, a superior tread profile S may be at least partially defined by the tops of the ribs 112 and the grooves 110, as discussed below. Thus, each of the ribs 112 and grooves 110 may be defined between the inferior tread profile I and the superior tread profile S.

The tread 102 may further define a top center point 120. The top center point 120 may generally be defined on the superior tread profile S, and may define the center of the tread 102 as viewed along the meridian plane. The top center point 120 may be defined on one of the plurality of ribs 112 or in one of the plurality of grooves 110, depending on the number and positioning of the ribs 112 and grooves 110.

The tread 102 may further define an edge of contact 122 or edges of contact 122. The edge of contact 122 may generally be a point on the tread 102 that, when the tire 100 is disposed on a surface, generally defines where the tread 102 ceases to contact the surface.

The superior tread profile S according to the present disclosure may have a generally continuous curvature between the edge of contact 122 and the top center point 120. As discussed below, this generally continuous curvature of the superior tread profile S allows the pressure distributions across the tread 102 to be reduced and controlled. Specifically, the use of splines to develop the continuous curvature of the superior tread profile S, as discussed below, allows the pressure distributions across the tread 102 to be reduced and controlled.

As shown in FIG. 2, the superior profile S may, in exemplary embodiments, include and be defined by a plurality of splines 130. Each of the splines 130 may extend between control points 132. As discussed below, each of the plurality of control points 132 may be spaced from the inferior profile I, and may further define the superior profile S. Each control point 132 may be defined on one of the plurality of ribs 112, such as on the top of the rib 112, or in one of the plurality of grooves 110, such as in the top of the groove 110. Additionally, control points 132 may be defined on, for example, the top center point 120, the edge of contact 122, and/or the intersection 106, as desired. Each of the plurality of splines 130 may extend between at least two of the control points 132. In the exemplary embodiment, the curvatures of adjacent splines 130 are generally equal at each of the control points 132. Thus, the generally continuous curvature of the superior tread profile S may be developed through the use of splines 130 with curvatures that are generally equal at control points 132.

As mentioned, the intersection 106 may define one of the control points 132, such as a first control point 134. An adjacent control point 132 may further be defined as a second control point 136. In some embodiments, one of the plurality of splines 130 may extend between the first and second control points 134, 136. In other embodiments, however, the superior tread profile S may further include a line 138 extending between the first control point 134 and the second control point 136. Further, as discussed below, the line 138 may have a tangency parameter, and the adjacent spline 130 extending from the second control point 136 may additionally have a tangency parameter. In exemplary embodiments, the tangency parameters of the line 138 and the adjacent spline 130 may be generally equal at the second control point 136.

In an exemplary embodiment, as discussed below with regard to FIG. 4, the superior tread profile S may comprise six splines 130. For example, six splines 130 may be formed to comprise the superior tread profile S between the top center point 120 and edge of contact 122. However, it should be understood that the present disclosure is not limited to six splines. Rather, any number of splines 130 less than six or greater than six is also within the scope and spirit of the present disclosure.

FIG. 4 provides a data plot illustrating one example of the pressures across a tread 102 formed utilizing six splines 130 and a line 138. The six splines 130 extend between the top center point 120 and the edge of contact 122, while the line 138 extends between the edge of contact 122 and the intersection 106. As illustrated by FIG. 4 and in comparison to FIG. 3, the relative pressure distributions along this tread 102 may be desirably lower and better controlled in critical areas of the tread 102. For example, the pressure distribution on the exterior portions of the shoulder ribs 114 may be lower and better controlled. Specifically, with reference to the X-axis in FIG. 4, the pressures in the region between an axial position of approximately −100 and an axial position of approximately −80, and in the region between an axial position of approximately 65 and an axial position of approximately 85, may be lower and better controlled than the pressure distributions shown in FIG. 3, as discussed above. This decrease in the relative pressures on the exterior portions of the shoulder ribs 114 and the better control of the pressure distributions throughout the tread 102 are advantageously due to the use of splines 130 in the design and formation of the tread 102.

It should be understood that the present disclosure is not limited to embodiments wherein the pressure distributions on the exterior portions of the shoulder ribs 114 are controlled. Rather, any embodiments wherein pressure distributions on any portion of a tread 102 are controlled through the use of a superior tread profile S having a generally continuous curvature, and through the use of splines 130 to create that generally continuous curvature, are within the scope and spirit of the present disclosure.

The present disclosure is further directed to a method for forming a tread 102 of a tire 100. As discussed above, the resulting tread 102, and specifically the superior tread profile S of the tread 102, may have a generally continuous curvature between the edge of contact 122 and the top center point 120.

In exemplary embodiments, the present method for forming a tread 102 may be performed utilizing any suitable software for modeling a tread 102. One example of a suitable software program for performing the method of the present disclosure is CATIA by DASSAULT SYSTÈMES. Other examples of suitable software include any suitable virtual or computer-aided design software programs, any suitable finite element analysis software programs, and any suitable programs capable of performing the mathematical formulas described herein.

It should be understood that the present method for forming a tread 102 is directed to both the design and development of a tire 100 and to the design and development of a tire mold for manufacturing the tire 100. Thus, the present disclosure encompasses the use of the present method for forming a tread 102 with regard to both the tire 100 and the tire mold.

The method includes the step of defining an inferior profile I of the tread 102. The method further includes the step of defining a plurality of control points 132 spaced from the inferior profile I. As discussed above, the control points 132 may at least partially define the superior tread profile S, and each control point 132 may define the top of one of the plurality of ribs 112 or one of the plurality of grooves 110.

Each of the plurality of control points 132 may be spaced from the inferior tread profile I by a depth parameter 150. The depth parameter 150 for each control point 132 may define the height of the rib 112 or the depth of the groove 110 associated with the control point 132. The depth parameters 150 may thus be chosen or controlled as desired to control the heights of the ribs 112 and/or the depths of the grooves 110.

Each of the plurality of control points 132 may further be spaced from adjacent control points 132 by a width parameter 152. The width parameter 152 may be defined between the adjacent control points 132, or may be defined for each control point 132 with respect to a reference point such as, for example, the top center point 120 or the edge of contact 122. The width parameters 152 may further define the width of the tread 102, and may thus be chosen or controlled as desired to control the width of the tread 102.

The method according to the present disclosure may further include the step of forming a plurality of splines 130. As discussed above, each of the plurality of splines 130 may extend between at least two of the plurality of control points 132. Further, the method may include the step of adjusting each of the plurality of splines 130 at each of the plurality of control points 132 such that the curvatures of adjacent splines 130 are generally equal at each of the plurality of control point 132.

In one embodiment, the adjusting step may include adjusting the curvature of each of the plurality of splines 130 at each of the plurality of control points 132. The curvature of a spline 130 at any point on the spline 130, as is generally understood in the art, is the second derivative of the equation of the spline 130 at that point. Thus, in accordance with the present method, for each control point 132, the second derivatives of the equations of the splines 130 that meet at that control point 132 may be adjusted to be generally equal.

In one embodiment, the curvatures of the splines 130 may be adjusted through the use of mathematical formulas. For example, the curvatures of adjacent splines 130 having equal curvatures at a control point 132 may be represented by the equation $f_i''(x_{i+1})=f_{i+1}''(x_{i+1})$, wherein i represents the control point 132. Thus, the above equation or a similar equation may be utilized to adjust the splines 130. Additionally or alternatively, the curvatures may be adjusted manually or semi-manually through the use of suitable software, as discussed above.

In an alternative embodiment, the adjusting step may include, for example, adjusting a tangency parameter for each of the splines 130 at each of the control points 132. The tangency parameter may generally be the parameter that establishes the slope and tangent line for a given spline 130 at a given point, such as at a control point 132. For example, the slope of a spline 130 at any point on the spline 130, as is generally understood in the art, is the first derivative of the equation of the spline 130 at that point. Thus, in accordance with the present method, for each control point 132, the first derivatives of the equations of the splines 130 that meet at that control point 132 may be adjusted to be generally equal.

In one embodiment, the tangency parameters may be adjusted in accordance with the present method through the use of mathematical formulas. For example, the slopes of adjacent splines 130 having equal slopes at a control point 132 may be represented by the equation $f_i'(x_{i+1})=f_{i+1}'(x_{i+1})$, wherein i represents a control point 132. Thus, the above equation or a similar equation may be utilized to adjust the splines 130. Additionally or alternatively, the tangency parameter may be adjusted manually or semi-manually through the use of suitable software, as discussed above.

The adjusting step may further include, for example, adjusting a tension parameter for each of the control points 132. In general, the tension parameter defines how sharply the splines 130 bend as the splines 130 extend from a control point 132. The concept of a tension parameter, as is generally known in the art, was derived from the physics of an elastic beam subjected to lateral forces and pulled under tension. In one embodiment, the tension parameter for each control point 132 may be adjusted in accordance with the present method through the use of a suitable mathematical formula. Additionally or alternatively, the tension parameter may be adjusted manually or semi-manually through the use of suitable software, as discussed above.

The forming step according to various embodiments of the present disclosure may further include forming a line 138 between a first control point 134 and a second control point 136. As discussed above, the first control point 134 may be defined at the intersection 106, and the second control point 136 may be the control point 132 adjacent to the first control point 134. The line 138 may extend between the first and second control points 134, 136.

Further, the adjusting step may include adjusting a tangency parameter for the spline 130 adjacent the line 138 at the second control point 136 such that the tangency parameter for the spline 130 at the second control point 136 is generally equal to a tangency parameter of the line 138. As discussed above, the tangency parameter may generally be the parameter that establishes the slope and tangent line for a given spline 130 at a given point, such as at a control point 132. Further, the tangency parameter of the line 138 may similarly generally be the parameter that establishes the slope and tangent line for the line 138 at a given point, such as at a control point 132. For example, the slope of the line 138 at any point on the line 138, as is generally understood in the art, is the first derivative of the equation of the line 138 at that point. Thus, in accordance with the present method and as discussed above with regard to the splines 130, for the second control point 136, the first derivatives of the equations of the line 138 and adjacent spline 130 may be adjusted to be generally equal.

In an exemplary embodiment, as discussed above with regard to FIG. 4, the forming step may include forming six splines 130. For example, six splines 130 may be formed between the top center point 120 and edge of contact 122. However, it should be understood that the present disclosure is not limited to the formation of six splines. Rather, the formation of any number of splines 130 less than six or greater than six is also within the scope and spirit of the present disclosure.

It should further be understood that, while the present disclosure generally discusses a tread 102 and a method for forming a tread 102 with reference to one half of the tread, between the top center point 120 and the edge of contact 122, intersection 106, and/or sidewall 104, the methods and apparatus herein may further apply to the other half of the tread extending from the top center point 120 to the opposing edge of contact 122, intersection 106, and/or sidewall 104.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for forming a tire tread, the tire comprising the tread and a sidewall, the method comprising:
    defining with a computing device, an inferior profile of the tread;
    defining with the computing device, a plurality of control points spaced from the inferior profile, each of the plurality of control points spaced from the inferior profile by a depth parameter, each of the plurality of control points spaced from adjacent control points of the plurality of control points by a width parameter;
    forming with the computing device, a plurality of splines, each of the plurality of splines extending between at least two of the plurality of control points; and
    adjusting with the computing device each of the plurality of splines at each of the control points such that the curvatures of adjacent splines are generally equal at each of the plurality of control points.

2. The computer-implemented method as in claim 1, wherein the adjusting step includes adjusting with the computing device, a tangency parameter for each of the plurality of splines at each of the plurality of control points such that the tangency parameters for each of the adjacent splines at each of the plurality of control points are generally equal, wherein the tangency parameter establishes a slope and a tangent for each of the plurality of spines at each of the plurality of control points.

3. The computer-implemented method as in claim 2, wherein the adjusting step further includes adjusting, with the computing device, a tension parameter for each of the plurality of control points, wherein the tension parameter defines a bend sharpness of each of the plurality of splines extending from each of the plurality of control points.

4. The computer-implemented method as in claim 1, wherein the forming step includes forming, the computing device, a line between a first control point and a second control point of the plurality of control points, the first control point defined at an intersection of the tread and the sidewall.

5. The computer-implemented method as in claim 4, wherein the adjusting step includes adjusting, with the computing device a tangency parameter for the spline adjacent the line at the second control point such that the tangency parameter for the spline at the second control point is generally equal to a tangency parameter of the line, wherein the tangency parameter establishes a slope and a tangent line for the spline adjacent the line and the line at the second control point.

6. The computer-implemented method as in claim 1, wherein the forming step includes forming, with the computing device, six splines between an edge of contact defined for the tire tread and a top center point defined for the tire tread.

* * * * *